(12) United States Patent
Kawai

(10) Patent No.: US 10,654,179 B2
(45) Date of Patent: May 19, 2020

(54) FORCE DETECTION APPARATUS AND ROBOT

(71) Applicant: Seiko Epson Corporation, Tokyo (JP)

(72) Inventor: Hiroki Kawai, Matsumoto (JP)

(73) Assignee: Seiko Epson Corporation (JP)

( * ) Notice: Subject to any disclaimer, the term of this patent is extended or adjusted under 35 U.S.C. 154(b) by 141 days.

(21) Appl. No.: 16/023,466

(22) Filed: Jun. 29, 2018

(65) Prior Publication Data

US 2019/0001511 A1 Jan. 3, 2019

(30) Foreign Application Priority Data

Jun. 30, 2017 (JP) ................. 2017-128485

(51) Int. Cl.
| | | |
|---|---|---|
| B25J 19/02 | (2006.01) | |
| G01L 5/00 | (2006.01) | |
| G01L 1/16 | (2006.01) | |
| B25J 13/08 | (2006.01) | |
| G01L 5/167 | (2020.01) | |

(52) U.S. Cl.
CPC .......... *B25J 19/028* (2013.01); *B25J 13/085* (2013.01); *G01L 1/16* (2013.01); *G01L 5/0071* (2013.01); *G01L 5/009* (2013.01); *G01L 5/167* (2013.01)

(58) Field of Classification Search
CPC ....... B25J 13/085; B25J 9/1694; G01L 5/009; G01L 5/167; G01L 5/226; G01L 1/16
See application file for complete search history.

(56) References Cited

U.S. PATENT DOCUMENTS

| | | | | |
|---|---|---|---|---|
| 4,802,371 A | * | 2/1989 | Calderara | ................. G01L 1/16 |
| | | | | 310/338 |
| 5,821,432 A | | 10/1998 | Sidler et al. | |
| 9,381,647 B2 | * | 7/2016 | Kamiya | ................. B25J 13/085 |
| 9,481,089 B2 | * | 11/2016 | Matsuzawa | ............ B25J 9/1694 |
| 2014/0053660 A1 | * | 2/2014 | Kamiya | .................... G01L 1/16 |
| | | | | 73/862.68 |
| 2014/0236354 A1 | * | 8/2014 | Kamiya | ................. B25J 13/085 |
| | | | | 700/258 |
| 2014/0366646 A1 | * | 12/2014 | Matsuzawa | ............... G01L 1/16 |
| | | | | 73/862.68 |
| 2015/0120051 A1 | * | 4/2015 | Matsuzawa | ......... H01L 41/1132 |
| | | | | 700/258 |
| 2015/0127159 A1 | * | 5/2015 | Kamiya | .................. G01P 15/18 |
| | | | | 700/258 |

(Continued)

FOREIGN PATENT DOCUMENTS

JP 10-068665 A 3/1998

*Primary Examiner* — Jonathan M Dunlap
(74) *Attorney, Agent, or Firm* — Harness, Dickey & Pierce, P.L.C.

(57) ABSTRACT

A force detection apparatus includes a first member, a second member, a piezoelectric sensor device sandwiched by the first member and the second member and outputting electric charge according to an external force, and a conversion and output circuit converting an electric charge output from the piezoelectric sensor device into a voltage and outputting the voltage. When a detectable range of a component of the external force in a predetermined axis direction is a first range, the external force is detected within the first range. When the detectable range is a second range different from the first range, the external force is detected within the second range.

16 Claims, 7 Drawing Sheets

(56) References Cited

U.S. PATENT DOCUMENTS

| | | | |
|---|---|---|---|
| 2015/0239126 A1* | 8/2015 | Matsuzawa | B25J 9/1694 |
| | | | 700/258 |
| 2016/0109311 A1* | 4/2016 | Inazumi | G01L 5/167 |
| | | | 73/862.042 |
| 2017/0021504 A1* | 1/2017 | Matsuzawa | B25J 9/1694 |
| 2018/0283966 A1* | 10/2018 | Matsuzawa | B25J 13/085 |

* cited by examiner

FORCE DETECTION APPARATUS AND ROBOT

BACKGROUND

1. Technical Field

The present invention relates to a force detection apparatus and robot.

2. Related Art

In a robot having an end effector and a robot arm, a force detection apparatus that detects a force applied to the end effector is used. The force detection apparatus is provided between the distal end part of the robot arm and the end effector. As the force detection apparatus, e.g. a six-axis force sensor that detects forces in axis directions of the respective three axes orthogonal to one another and forces (moment) about the respective three axes or the like is used. Further, Patent Document 1 (JP-A-10-68665) discloses a measuring apparatus that measures (detects) a force or inertia.

In the measuring apparatus disclosed in Patent Document 1, a range in which the force can be detected (detectable range) is set to a single range for each measuring apparatus and it is impossible for the apparatus to measure a force beyond the detectable range.

Further, resolution required for the measuring apparatus may differ depending on work performed by a robot. However, in the measuring apparatus disclosed in Patent Document 1, single resolution is set for each measuring apparatus and, accordingly, when the resolution does not cover the required resolution, it is necessary to replace the measuring apparatus.

SUMMARY

An advantage of some aspects of the invention is to solve at least a part of the problems described above, and the invention can be implemented as the following application examples or embodiments.

A force detection apparatus according to an aspect of the invention includes a first member, a second member, and a piezoelectric sensor device sandwiched by the first member and the second member and outputting electric charge according to an external force, wherein, when a detectable range of a component of the external force in a predetermined axis direction is a first range, the external force is detected within the first range, and, when the detectable range is a second range different from the first range, the external force is detected within the second range.

According to the force detection apparatus according to the aspect of the invention, the first range and the second range different from each other can be set as the ranges in which forces (external forces) can be detected (detectable ranges). Therefore, one of the first range and the second range is selected according to the magnitude of the force to be detected, and thereby, the force can be properly detected.

Further, resolution can be made higher by reduction of the detectable range. Therefore, one of the first range and the second range is selected according to the resolution to be required, and thereby, the force can be properly detected.

In the force detection apparatus according to the aspect of the invention, it is preferable that the piezoelectric sensor device includes a sensor element placed in the first member, the sensor element includes a first piezoelectric material layer and a second piezoelectric material layer placed on one side of the first piezoelectric material layer, and the first piezoelectric material layer and the second piezoelectric material layer respectively output electric charge according to external forces applied in first directions.

With this configuration, the forces applied in the first directions can be detected.

In the force detection apparatus according to the aspect of the invention, it is preferable that a first conversion and output circuit having a first capacitor, and converting the electric charge output from the first piezoelectric material layer into a voltage and outputting the voltage, and a second conversion and output circuit having a second capacitor with different capacitance from that of the first capacitor, and converting the electric charge output from the second piezoelectric material layer into a voltage and outputting the voltage are provided.

With this configuration, a detection mode with the wider detectable range and the lower resolution and a detection mode with the narrower detectable range and the higher resolution can be realized.

In the force detection apparatus according to the aspect of the invention, it is preferable that the sensor element includes a third piezoelectric material layer placed on a side of the second piezoelectric material layer opposite to the first piezoelectric material layer, and a fourth piezoelectric material layer placed on a side of the third piezoelectric material layer opposite to the second piezoelectric material layer, and the third piezoelectric material layer and the fourth piezoelectric material layer respectively output electric charge according to external forces applied in second directions different from the first directions.

With this configuration, the forces applied in the second directions can be detected.

In the force detection apparatus according to the aspect of the invention, it is preferable that the first directions and the second directions are orthogonal.

With this configuration, the forces applied in the first directions and the forces applied in the second directions orthogonal to the first directions can be detected.

In the force detection apparatus according to the aspect of the invention, it is preferable that a third conversion and output circuit having a third capacitor, and converting the electric charge output from the third piezoelectric material layer into a voltage and outputting the voltage, and a fourth conversion and output circuit having a fourth capacitor with different capacitance from that of the third capacitor, and converting the electric charge output from the fourth piezoelectric material layer into a voltage and outputting the voltage are provided.

With this configuration, a detection mode with the wider detectable range and the lower resolution and a detection mode with the narrower detectable range and the higher resolution can be realized.

In the force detection apparatus according to the aspect of the invention, it is preferable that a plurality of the sensor elements are provided.

With this configuration, the forces in the plurality of axis directions can be detected.

In the force detection apparatus according to the aspect of the invention, it is preferable that the first range and the second range have equal lower limit values, but different upper limit values.

With this configuration, in the case where the upper limit value of the first range is larger than the upper limit value of the second range as an example, when the force to be detected is equal to or smaller than the upper limit value of the second range, the second range with the higher resolution is selected, and thereby, the detection can be accurately performed. Alternatively, when the force to be detected exceeds the upper limit value of the second range, the first range is selected, and thereby, the detection can be performed.

A robot according to an aspect of the invention includes a robot arm and the detection apparatus according to the aspect of the invention provided in the robot arm.

According to the robot according to the aspect of the invention, in the force detection apparatus, the first range and the second range are set as ranges in which forces can be detected (detectable ranges). Therefore, one of the first range and the second range is selected according to the magnitude of the force to be detected, and thereby, the force can be properly detected.

Further, resolution can be made higher by reduction of the detectable range. Therefore, one of the first range and the second range is selected according to the resolution to be required, and thereby, the force can be properly detected.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a force detection apparatus and robot according to the invention will be explained in detail based on embodiments shown in the accompanying drawings. The respective drawings contain parts enlarged or reduced as appropriate and parts omitted so that the parts to be explained can be recognized. Further, in this specification, "connection" includes direct connection and indirect connection via an arbitrary member.

1. Robot

First, a robot will be explained.

Figure 1:
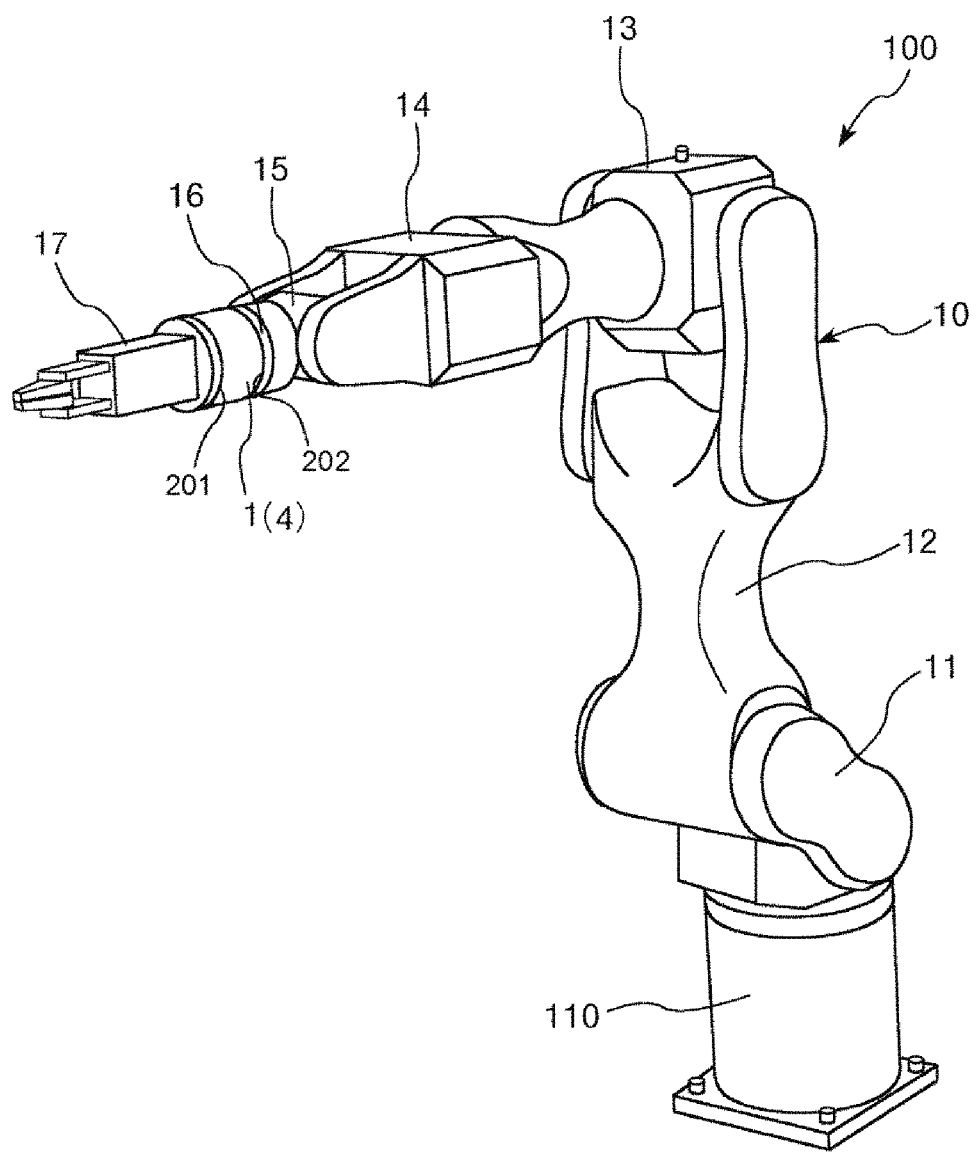
FIG. 1 is a perspective view showing an embodiment of a robot according to the invention.

FIG. 1 is a perspective view showing an embodiment of a robot according to the invention. Note that the side of a base 110 in FIG. 1 is referred to as "proximal end" and the opposite side (the side of an end effector 17) is referred to as "distal end".

A robot 100 shown in FIG. 1 may perform respective work of feeding, removing, carrying, assembly, inspection, etc. of objects including precision apparatuses and components forming the apparatuses. The robot 100 is the so-called single-arm six-axis vertical articulated robot.

The robot 100 has the base 110 and a robot arm 10 rotatably coupled to the base 110. Further, a force detection apparatus 1 is connected to the robot arm 10 and the end effector 17 is connected to the force detection apparatus 1.

The base 110 is a part fixed to e.g. a floor, wall, ceiling, movable platform, or the like. Note that the base 110 itself may be movable as long as the robot arm 10 is connected to the base 110. The robot arm 10 has an arm 11 (first arm), an arm 12 (second arm), an arm 13 (third arm), an arm 14 (fourth arm), an arm 15 (fifth arm), and an arm 16 (sixth arm). These arms 11 to 16 are sequentially coupled from the proximal end side toward the distal end side. The respective arms 11 to 16 are rotatable with respect to the adjacent arms or base 110.

The force detection apparatus 1 is provided between the arm 16 and the end effector 17. In this case, the force detection apparatus 1 is detachably connected to the arm 16 and the end effector 17 is detachably connected to the force detection apparatus 1. Note that the force detection apparatus 1 may be undetachably connected to the arm 16 and the end effector 17 may be undetachably connected to the force detection apparatus 1. The force detection apparatus 1 detects forces (including moment) applied to the end effector 17. The force detection apparatus 1 will be described later in detail.

The arm 16 and the end effector 17 include attachment members (not shown) for attachment of the force detection apparatus 1. The configuration of the attachment members is not particularly limited. For example, a configuration having through holes (female screws) used for attachment of the force detection apparatus 1 to the arm 16 or end effector 17 by screwing, bolting, or the like or a configuration having an engagement portion such as a hook or L-shaped groove may be employed. Thereby, the force detection apparatus 1 may be easily attached to an appropriate position. Accordingly, detection accuracy of the external force by the force detection apparatus 1 may be made higher.

The end effector 17 is a tool (device) for performing work on an object as a work object of the robot 100 and includes a hand having a function of grasping (holding) the object. Note that the end effector 17 is not limited to the hand, but a tool for the details of work or the like of the robot 100 may be used. Another end effector 17 than the hand includes e.g. a screwing tool for screwing.

Further, the robot 100 has drive units (not shown) including motors that rotate one arm with respect to the other arm (or base 110). Further, the robot 100 has angle sensors (position sensors, not shown) that detect rotation angles of the rotation shafts of the motors. The drive units and the angle sensors are provided in e.g. the respective arms 11 to 16.

The above described robot 100 is controlled by a robot control apparatus (not shown). Further, the main part of a robot system is formed by the robot 100 and the robot control apparatus.

The robot control apparatus includes a control unit (not shown) that performs respective controls, a memory unit (not shown) that stores various kinds of information, etc. Specifically, the robot control apparatus includes e.g. a personal computer (PC) containing a CPU (Central Processing Unit) or the like, and controls the respective parts including the respective drive units of the robot 100. Further, programs for controlling the robot 100 are stored in the memory unit in advance.

The robot control apparatus may be formed separately from the robot 100 or partially or entirely provided in the robot 100. The robot 100 and the robot control apparatus may be electrically connected (hereinafter, also simply referred to as "connected") by a cable (wire) (not shown) for wired communications, or the cable may be omitted for wireless communications. That is, the robot 100 and the robot control apparatus may be connected via wired communications or wireless communications.

Further, the robot control apparatus controls the driving (action) of the robot 100 by position control, force control, or the like based on output of the respective angle sensors and output of the force detection apparatus 1, i.e., detection results of the respective angle sensors and detection results of the force detection apparatus 1 in the work performed by the robot 100.

The position control refers to control of the action of the robot 100 to move the distal end part of the robot arm 10 or the end effector 17 to a target position in a target posture based on information on the position and the posture of the distal end part of the robot arm 10 or the end effector 17 of the robot 100. The information on the position and the posture of the distal end part of the robot arm 10 or the end effector 17 can be obtained based on the detection results of the respective angle sensors.

Further, the force control refers to control of the action of the robot 100 to perform force detection using the force detection apparatus 1, and change the position and the posture of the distal end part of the robot arm 10 or the end effector 17 and push or pull the end effector 17 based on the detection results of the force detection apparatus 1. The force control includes e.g. impedance control.

2. Force Detection Apparatus

Next, the force detection apparatus will be explained.

Figure 2:
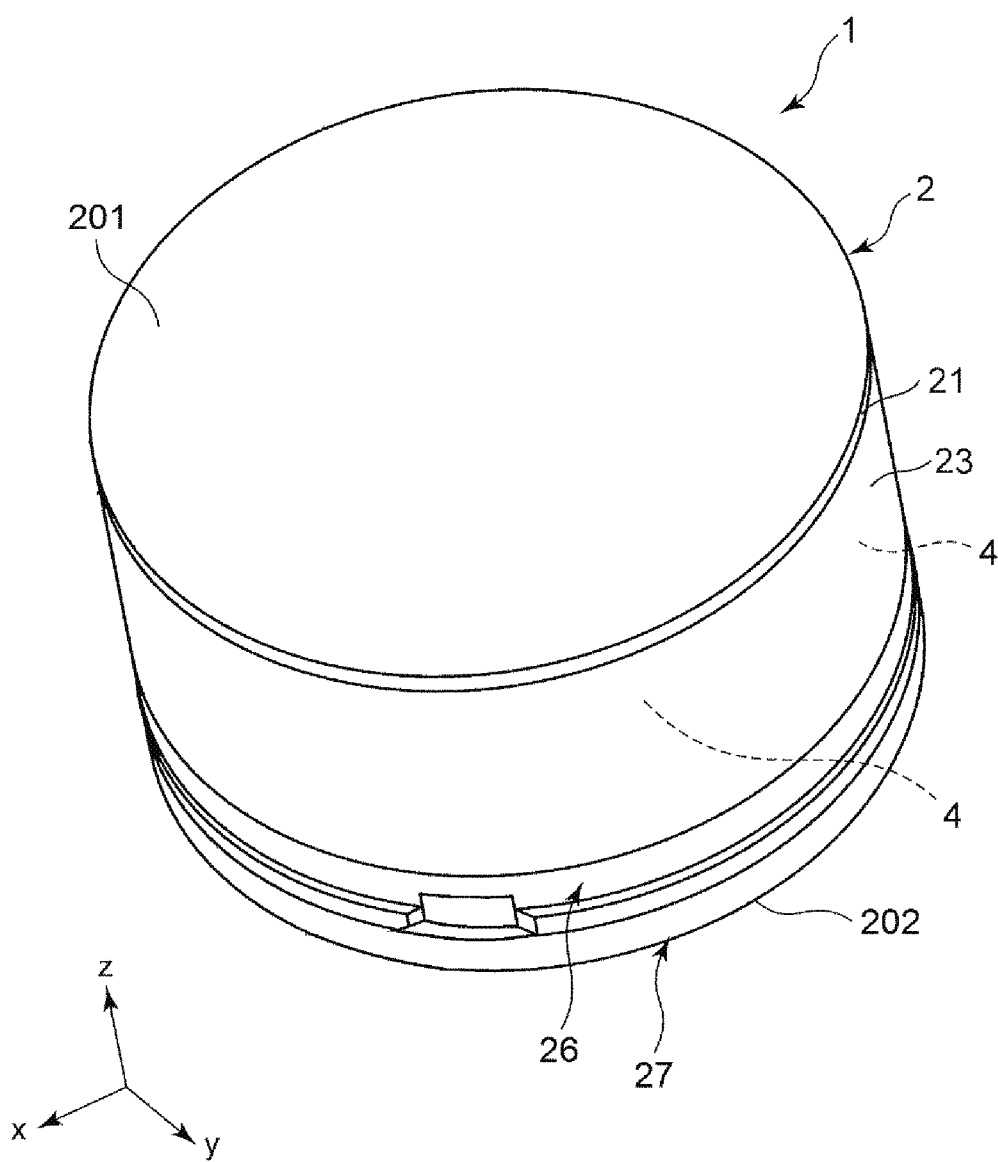
FIG. 2 is a perspective view showing an embodiment of a force detection apparatus according to the invention.
Figure 3:
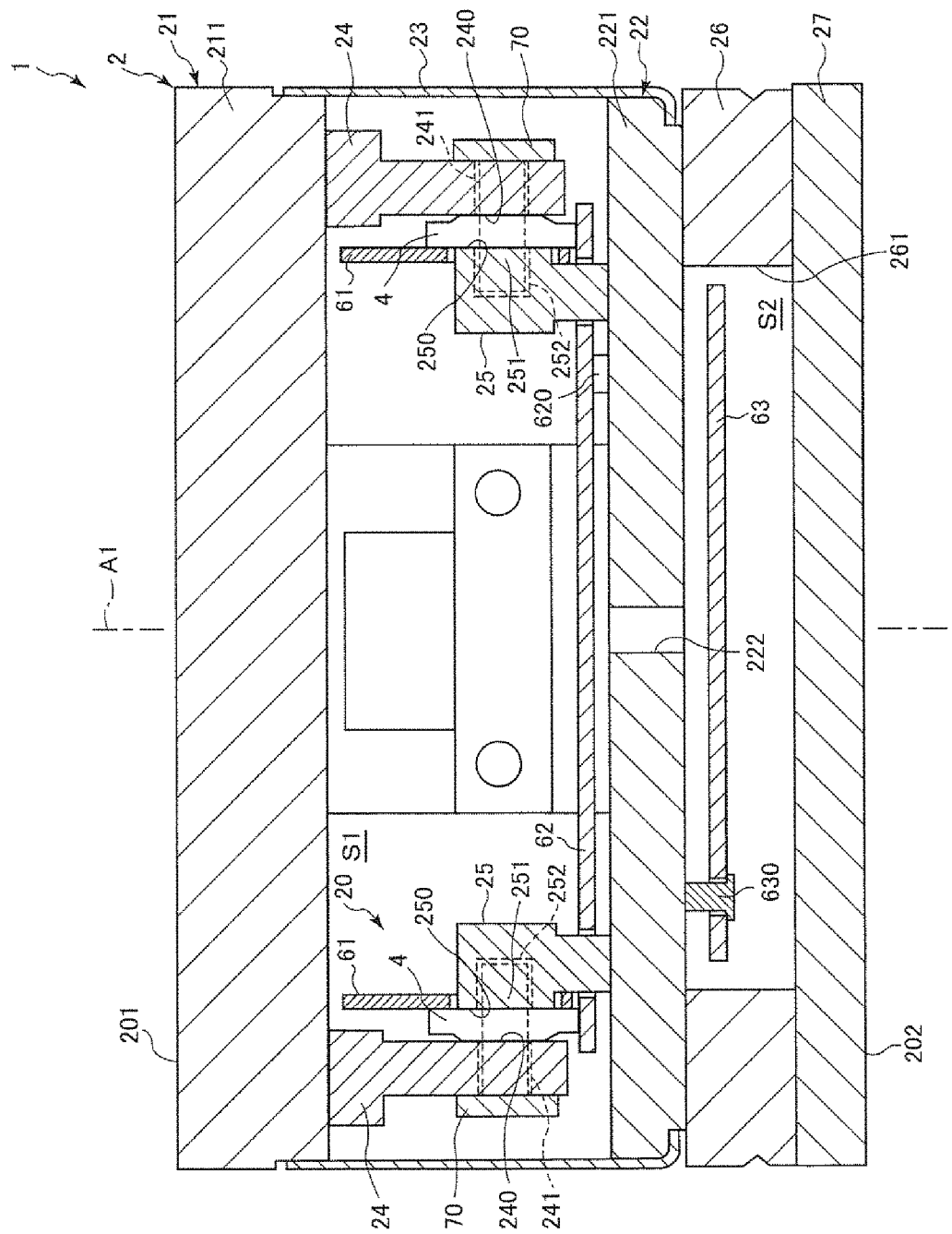
FIG. 3 is a longitudinal sectional view of the force detection apparatus shown in FIG. 2.
Figure 4:
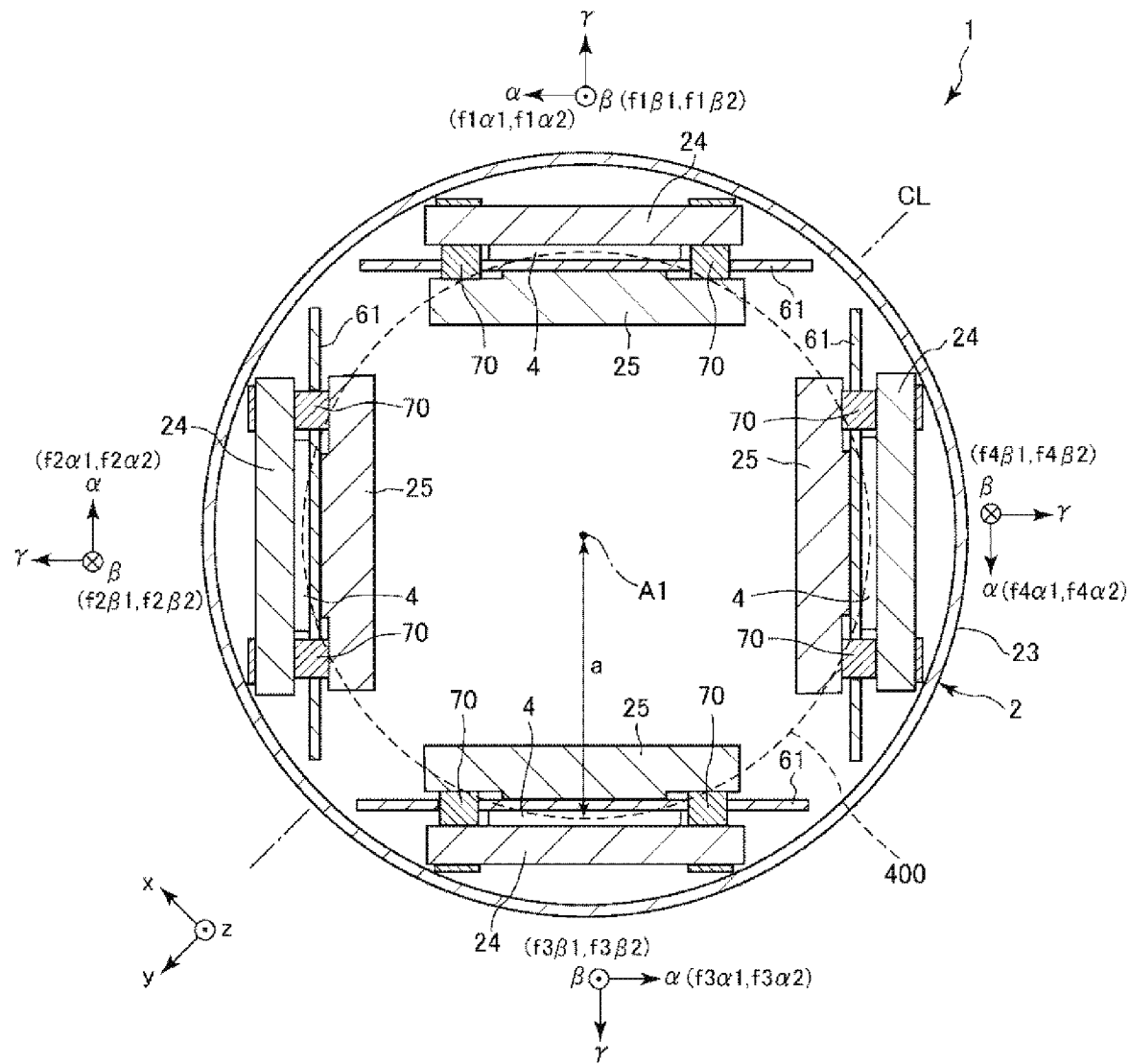
FIG. 4 is a plan view showing inside of the force detection apparatus shown in FIG. 2.
Figure 5:
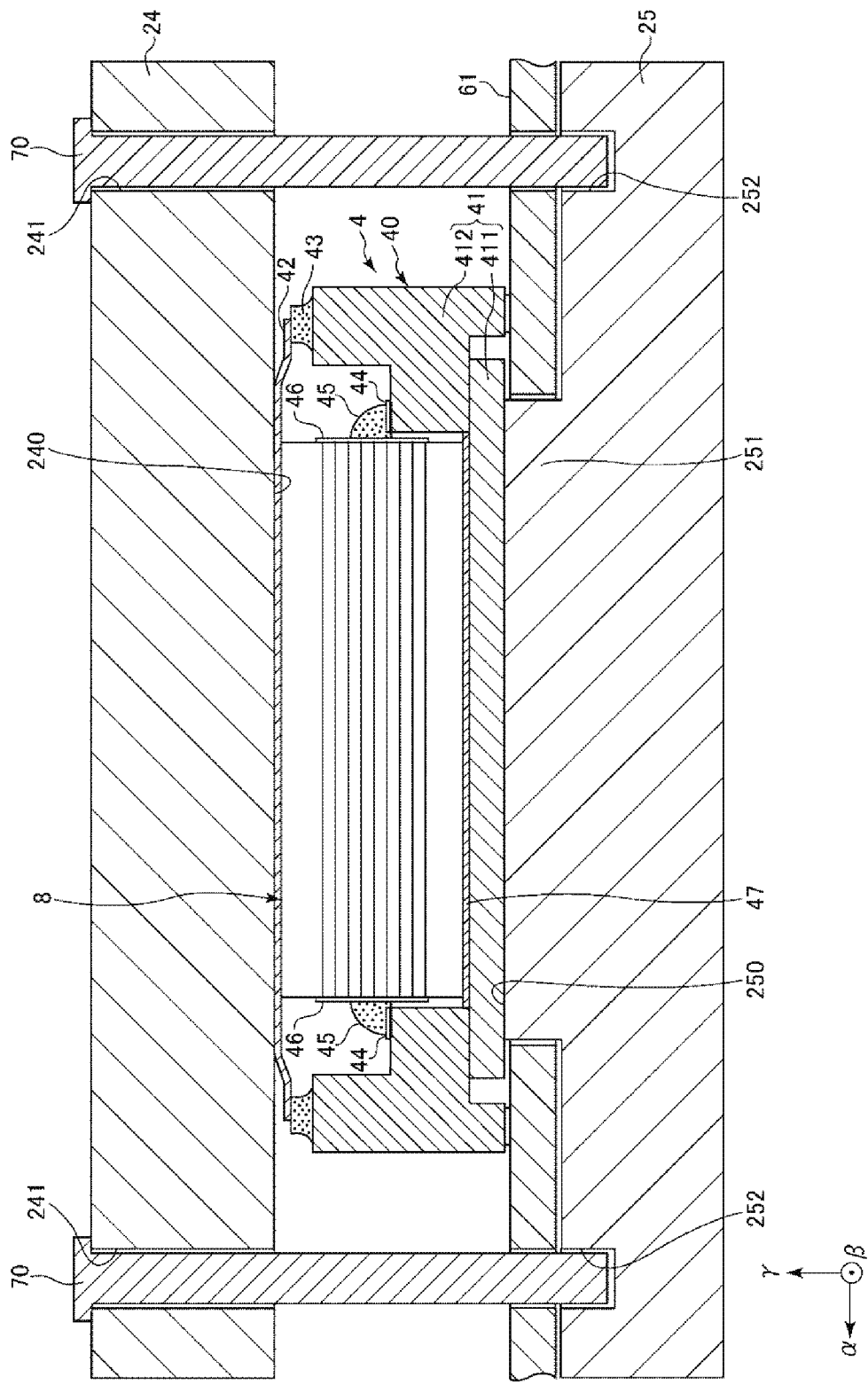
FIG. 5 is a sectional view showing a sensor device of the force detection apparatus shown in FIG. 2.
Figure 6:
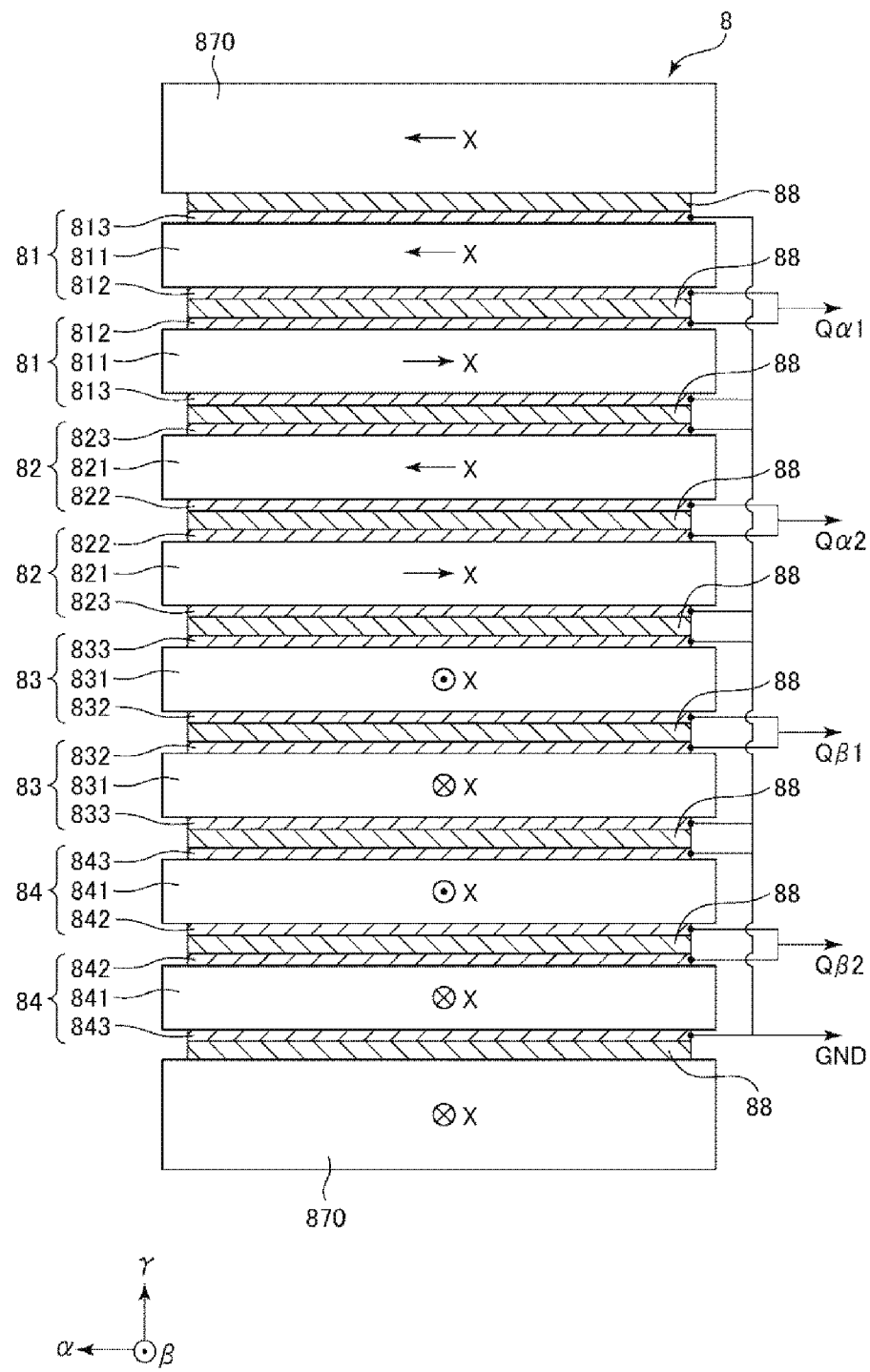
FIG. 6 is a sectional view showing a force detection element of the sensor device shown in FIG. 5.
Figure 7:
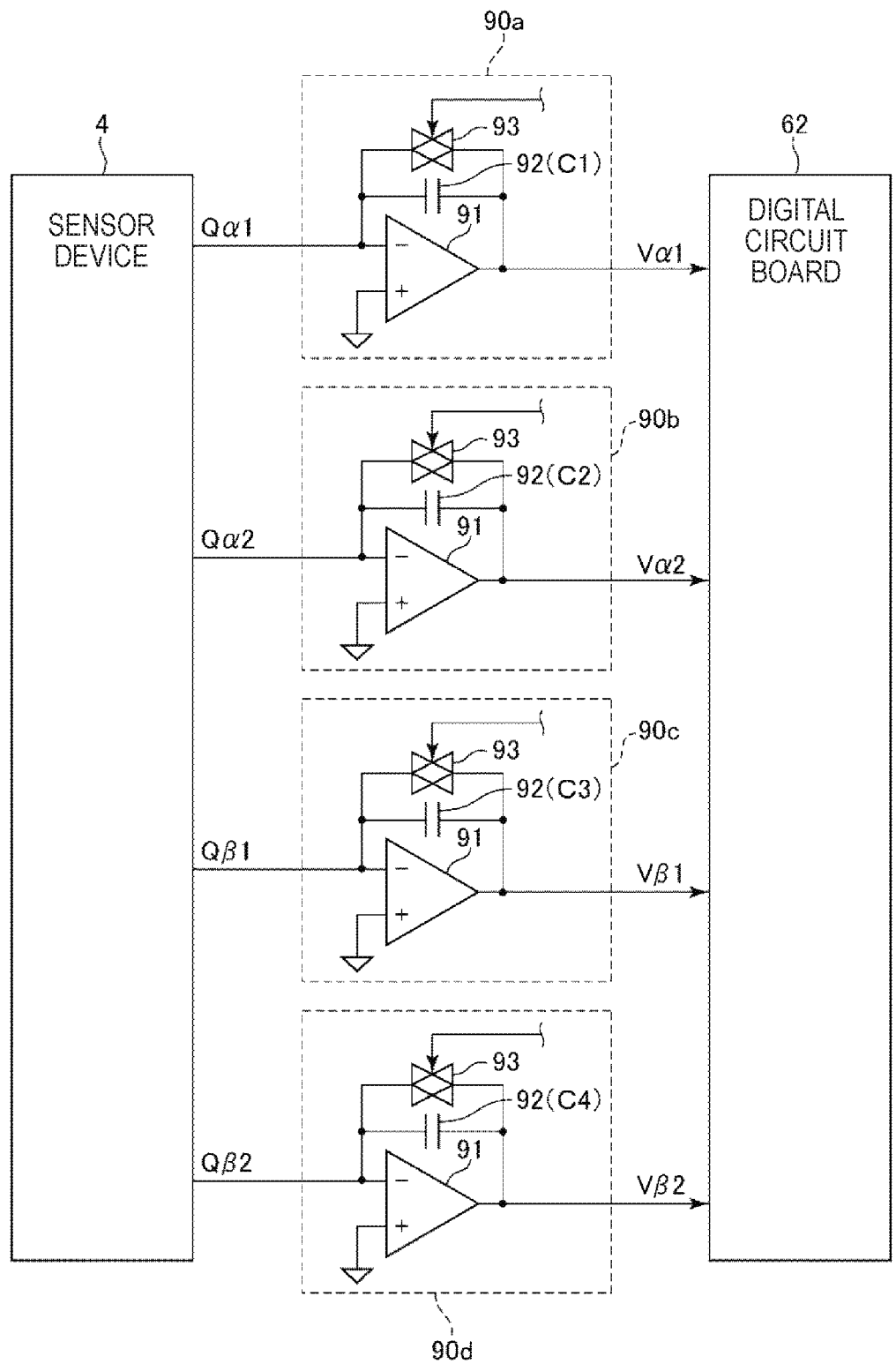
FIG. 7 is a circuit diagram (block diagram) of a conversion and output circuit of the force detection apparatus shown in FIG. 2.

FIG. 2 is a perspective view showing an embodiment of the force detection apparatus according to the invention. FIG. 3 is a longitudinal sectional view of the force detection apparatus shown in FIG. 2. FIG. 4 is a plan view showing inside of the force detection apparatus shown in FIG. 2. FIG. 5 is a sectional view showing a sensor device of the force detection apparatus shown in FIG. 2. FIG. 6 is a sectional view showing a force detection element of the sensor device shown in FIG. 5. FIG. 7 is a circuit diagram (block diagram) of a conversion and output circuit of the force detection apparatus shown in FIG. 2. Note that, in FIG. 4, a digital circuit board 62 is not shown. Further, in FIGS. 2 and 4, for convenience of explanation, an x-axis, y-axis, and z-axis are shown as three axes orthogonal to one another and the tip end sides of arrows showing the respective axes are "+" and the tail end sides are "−". Further, directions parallel to the x-axis are also referred to as "x-axis directions", directions parallel to the y-axis are also referred to as "y-axis directions", and directions parallel to the z-axis are also referred to as "z-axis directions". Furthermore, hereinafter, the +z-axis direction (the positive side in the z-axis direction) is also referred to as "upper" and the −z-axis direction (the negative side in the z-axis directions) is also referred to as "lower". In FIGS. 4 to 6, for convenience of explanation, an α-axis, β-axis, and γ-axis are shown as three axes orthogonal to one another and the tip end sides of arrows showing the respective axes are "+" and the tail end sides are "−". Further, directions parallel to the α-axis are also referred to as "α-axis directions", directions parallel to the β-axis are also referred to as "β-axis directions", and directions parallel to the γ-axis are also referred to as "γ-axis directions".

The force detection apparatus 1 shown in FIG. 2 is the six-axis force sensor that can detect six axis components of an external force applied to the force detection apparatus 1. Here, the six axis components include translational force (shear force) components in the respective directions of the three axes orthogonal to one another (in the drawings, the x-axis, y-axis, and z-axis) and rotational force (moment) components about the respective three axes.

The force detection apparatus 1 has a case 2, aboard housing member 26 connected to the case 2, a connection member 27 connected to the board housing member 26, a plurality of (four in the embodiment) sensor devices 4 (piezoelectric sensor devices) housed within the case 2, a plurality of (four in the embodiment) analog circuit boards 61, the single digital circuit board 62, and a relay board 63 housed in the board housing member 26. Note that the outer shape of the force detection apparatus 1 as seen from the z-axis direction is a circular shape as shown in FIG. 2, however, includes, but is not limited to, e.g. a polygonal shape such as a quadrangular shape or pentagonal shape, an elliptical shape, or the like. Further, the number of sensor devices 4 is four, however, includes, but is not limited to, e.g. one, two, three, five, or more.

In the force detection apparatus 1, the respective sensor devices 4 output signals (detection results) according to the applied external forces and the signals are processed by the analog circuit boards 61 and the digital circuit board 62. Thereby, the six axis components of the external force applied to the force detection apparatus 1 are detected. Further, the signals processed by the digital circuit board 62 are externally output via the relay board 63 electrically connected to the digital circuit board 62.

As below, the respective parts of the force detection apparatus 1 will be explained.

Case

As shown in FIG. 3, the case 2 has a first case member (first member), a second case member 22 (second member) placed apart from the first case member 21, and a side wall part 23 (third case member) provided in the outer peripheral parts of the first case member 21 and the second case member 22.

First Case Member

The first case member 21 has a first plate 211 in a circular plate shape, and a plurality of (four in the embodiment) first fixing portions 24 (first members) stood in the outer peripheral part of the lower surface of the first plate 211 (see FIGS. 3 and 4). Note that, in the drawings, the first fixing portions 24 and the first plate 211 are separately formed, however, may be integrally formed. Further, the upper surface of the first case member 21 forms an attachment surface 201 to which the end effector 17 is attached (see FIGS. 1 and 3).

As shown in FIG. 3, the respective first fixing portions 24 are connected to the first plate 211 and the sensor devices 4 and have functions of transmitting the external force applied to the force detection apparatus 1 to the sensor devices 4. These plurality of first fixing portions 24 are arranged at equal angular (90°) intervals from each other along the same circumference around a center axis A1 of the force detection apparatus 1 (see FIG. 4). Note that, as shown in FIG. 3, the plurality of first fixing portions 24 have inner wall surfaces 240 located on the center axis A1 side and the inner wall surfaces 240 are in contact with the sensor devices 4. In the respective first fixing portions 24, a plurality of through holes 241 in which pressurization bolts 70, which will be described later, can be inserted are formed.

Second Case Member

The second case member 22 has a second plate 221 in a circular plate shape placed to be opposed to the first plate 211, and a plurality of (four in the embodiment) second fixing portions 25 (second members) stood in the outer peripheral part of the upper surface of the second plate 221 (see FIGS. 3 and 4). Note that, in the drawings, the second fixing portions 25 and the second plate 221 are separately formed, however, may be integrally formed.

As shown in FIG. 3, the respective second fixing portions 25 are connected to the second plate 221 and the sensor devices 4 and have functions of transmitting the external force applied to the force detection apparatus 1 to the sensor devices 4. These plurality of second fixing portions 25 are arranged at equal angular (90°) intervals from each other along the same circumference around the center axis A1 (see FIG. 4). The respective second fixing portions 25 are placed on the center axis A1 side with respect to the above described first fixing portions 24 and face the first fixing portions 24. Further, as shown in FIG. 3, the first fixing portions 24 sides of the second fixing portions 25 have projecting parts 251 projecting toward the first fixing portions 24 sides. Top surfaces 250 of the projecting parts 251 face the inner wall surfaces 240 of the first fixing portions 24 at a distance at which the sensor devices 4 can be inserted. Furthermore, a plurality of female screws 252 that can be screwed together with the tip end portions of the pressurization bolts 70 are formed in the respective second fixing portions 25.

Here, the plurality of pressurization bolts 70 (pressurizing members) are inserted into the through holes 241 of the above described first fixing portions 24 and the female screws 252 of the second fixing portions 25, and provided around the sensor devices 4. Particularly, in the embodiment, as shown in FIG. 4, two of the pressurization bolts 70 are provided on both sides of the single sensor device 4 in a plan view. Thereby, the sensor device 4 is sandwiched by the first fixing portion 24 and the second fixing portion 25, and thereby, held with pressure. The fastening forces of the pressurization bolts 70 are appropriately adjusted, and thereby, pressure with predetermined magnitude may be applied to the sensor devices 4. The constituent material of the respective pressurization bolts 70 includes, but is not particularly limited to, e.g. various metal materials.

As shown in FIG. 3, in the second plate 221, a through hole 222 penetrating in the thickness direction is provided. Through the through hole 222, a wire (not shown) electrically connecting the digital circuit board 62 and the relay board 63 to be described later etc. are inserted.

Side Wall Part

As shown in FIG. 4, the side wall part 23 (third case member) has a cylindrical shape. The upper end portion of the side wall part 23 is fitted with the first plate 211 via a sealing member (not shown) formed by e.g. an O-ring (see FIG. 3). Further, similarly, the lower end portion of the side wall part 23 is fitted with the second plate 221 via a sealing member (not shown). Thereby, the first case member 21, the second case member 22, and the side wall part 23 form an air-tight internal space S1 housing the plurality of sensor devices 4.

Board Housing Member

As shown in FIG. 3, the board housing member 26 is provided between the case 2 and the connection member 27, and the upper surface thereof is connected to the second case member 22 and the lower surface thereof is connected to the connection member 27 to be described later. The board housing member 26 has a cylindrical shape with a hole 261 penetrating in the center part. The relay board 63 to be described later is housed within the hole 261. The opening area of the hole 261 is not particularly limited as long as the hole can house the shape of the relay board 63.

Connection Member

The connection member 27 shown in FIG. 2 has a circular plate shape and the upper surface thereof is connected to the board housing member 26. Thereby, as shown in FIG. 3, the opening on the lower surface side of the hole 261 of the above described board housing member 26 is closed and an internal space S2 housing the relay board 63 placed in the hole 261 is formed. Further, the lower surface of the connection member 27 forms an attachment surface 202 to which the arm 16 is attached (see FIGS. 1 and 3).

The respective constituent materials of the above described first case member 21, second case member 22, side wall part 23, board housing member 26, and the connection member 27 include, but are not particularly limited to, e.g. metal materials such as aluminum and stainless steel, ceramics, etc. All of the members may be formed using the same or same kind of material or different materials from one another.

Analog Circuit Board

As shown in FIG. 4, the plurality of (four in the embodiment) analog circuit boards 61 are provided within the case 2. In the embodiment, one analog circuit board 61 is provided for each sensor device 4 and the single sensor device 4 and the corresponding single analog circuit board 61 are electrically connected. The analog circuit board 61 is provided between the first fixing portion 24 and the second fixing portion 25 and placed on the center axis A1 side with respect to the sensor device 4 when the projecting part 251 is inserted (see FIGS. 3 and 4).

Each of the four analog circuit boards 61 includes conversion and output circuits $90a$, $90b$, $90c$, $90d$ (charge amplifiers) that respectively convert electric charge Q ($Q\alpha1$, $Q\alpha2$, $Q\beta1$, $Q\beta2$) output from the sensor device 4 (force detection element 8) to be described later into voltages V ($V\alpha1$, $V\alpha2$, $v\beta1$, $V\beta2$).

Conversion and Output Circuits

As shown in FIG. 7, the conversion and output circuit $90a$ (first conversion and output circuit), the conversion and output circuit $90b$ (second conversion and output circuit), the conversion and output circuit $90c$ (third conversion and output circuit), and the conversion and output circuit $90d$ (fourth conversion and output circuit) are connected to the sensor device 4 (force detection element 8).

The conversion and output circuit $90a$ (charge amplifier) has a function of converting the electric charge $Q\alpha1$ output from two piezoelectric elements 81 (see FIG. 6) of the sensor device 4 into the voltage $V\alpha1$. The conversion and output circuit $90b$ (charge amplifier) has a function of converting the electric charge $Q\alpha2$ output from two piezoelectric elements 82 (see FIG. 6) of the sensor device 4 into the voltage $V\alpha2$. The conversion and output circuit $90c$ (charge amplifier) has a function of converting the electric charge $Q\beta1$ output from two piezoelectric elements 83 (see FIG. 6) of the sensor device 4 into the voltage $V\beta1$. The conversion and output circuit $90d$ (charge amplifier) has a function of converting the electric charge $Q\beta2$ output from two piezoelectric elements 84 (see FIG. 6) of the sensor device 4 into the voltage $V\beta2$.

The voltage $V\alpha1$ is a voltage corresponding to the external force (shear force) parallel to the $\alpha$-axis, and the external force parallel to the $\alpha$-axis may be obtained from the $V\alpha1$. The voltage $V\alpha2$ is a voltage corresponding to the external force (shear force) parallel to the $\alpha$-axis, and the external force parallel to the $\alpha$-axis may be obtained from the $V\alpha2$. The voltage $V\beta1$ is a voltage corresponding to the external force (shear force) parallel to the $\beta$-axis, and the external force parallel to the $\beta$-axis may be obtained from the $V\beta1$. The voltage $V\beta2$ is a voltage corresponding to the external force (shear force) parallel to the $\beta$-axis, and the external force parallel to the $\beta$-axis may be obtained from the $V\beta2$.

The conversion and output circuits 90a, 90b, 90c, 90d are the same, and the conversion and output circuit 90a will be representatively explained.

The conversion and output circuit 90a has an operational amplifier 91, a capacitor 92 (first capacitor), and a switching element 93. The first input terminal (minus input terminal) of the operational amplifier 91 is connected to output electrode layers 812 of the two piezoelectric elements 81, and the second input terminal (plus input terminal) of the operational amplifier 91 is grounded (connected) to the ground (reference potential point). Further, the output terminal of the operational amplifier 91 is connected to an external force detection circuit (not shown) of the digital circuit board 62 to be described later. The capacitor 92 is connected between the first input terminal and the output terminal of the operational amplifier 91. The switching element 93 is connected between the first input terminal and the output terminal of the operational amplifier 91, and parallel-connected to the capacitor 92. Further, the switching element 93 is connected to a drive circuit (not shown), and the switching element 93 executes switching operation according to on/off signals from the drive circuit.

When the switching element 93 is off, the electric charge $Q\alpha1$ output from the two piezoelectric elements 81 is accumulated in the capacitor 92 and output to the external force detection circuit as the voltage $V\alpha1$. Then, when the switching element 93 is turned on, the terminals of the capacitor 92 are short circuited. As a result, the electric charge $Q\alpha1$ accumulated in the capacitor 92 is discharged to be zero coulomb and the voltage V output to the external force detection circuit is 0 volts. Turning on of the switching element 93 is referred to as resetting of the conversion and output circuit 90a. Note that the voltage $V\alpha1$ output from the ideal conversion and output circuit 90a is proportional to the amount of accumulation of the electric charge $Q\alpha1$ output from the two piezoelectric elements 81.

The capacitor 92 is not particularly limited, and, when the statistic capacitance of the capacitor 92 (first capacitor) connected to the piezoelectric elements 81 is C1 and the capacitance of the capacitor 92 (second capacitor) connected to the piezoelectric elements 82 is C2, C1 and C2 are set to different values. In the embodiment, C2 is set to be smaller than C1. Further, when the capacitance of the capacitor 92 (third capacitor) connected to the piezoelectric elements 83 is C3 and the capacitance of the capacitor 92 (fourth capacitor) connected to the piezoelectric elements 84 is C4, C3 and C4 are set to different values. In the embodiment, C4 is set to be smaller than C3.

Here, when the capacitance of the capacitor 92 of the conversion and output circuit 90a is made larger, the range in which the force can be detected (measured) (hereinafter, also referred to as "detectable range") is wider, that is, the upper limit value of the detectable range is larger. Note that the lower limit value of the detectable range is fixed. On the other hand, when the capacitance of the capacitor 92 is made larger, the resolution becomes lower. That is, when the capacitance of the capacitor 92 is made smaller, the resolution becomes higher.

Accordingly, C1, C2, C3, C4 are set as described above, and thereby, a rated measurement mode (first detection mode) and a high-resolution mode (second detection mode), which will be described later, may be realized.

Note that C1 and C3 may be the same or different. Similarly, C2 and C4 may be the same or different.

The switching element 93 is not particularly limited, but e.g. a MOSFET (Metal Oxide Semiconductor Filed Effect Transistor), semiconductor switch, or MEMS switch may be used. These switches are smaller and lighter than mechanical switches, and thus, advantageous to reduction in size and weight of the force detection apparatus 1. Note that a mechanical switch may be used in place of the switching element 93.

In the embodiment, the switching element 93 is provided in the conversion and output circuits 90a, 90b, 90c, 90d, however, not limited to that. For example, the element may be provided in the digital circuit board 62.

As below, the case where the MOSFET is used as the switching element 93 will be explained as a representative example.

The switching element 93 has a drain electrode, a source electrode, and a gate electrode. One of the drain electrode and the source electrode of the switching element 93 is connected to the first input terminal of the operational amplifier 91, and the other of the drain electrode and the source electrode is connected to the output terminal of the operational amplifier 91. Further, the gate electrode of the switching element 93 is connected to the drive circuit (not shown).

To the switching elements 93 of the respective conversion and output circuits 90a, 90b, 90c, 90d, the same drive circuit may be connected or different drive circuits may be connected. All synchronized on/off signals are input from the drive circuit to the respective switching elements 93. Thereby, the operations of the switching elements 93 of the respective conversion and output circuits 90a, 90b, 90c, 90d are synchronized. That is, on/off times of the switching elements 93 of the respective conversion and output circuits 90a, 90b, 90c, 90d coincide.

Here, in the embodiment, in the detection by the force detection apparatus 1, the electric charge is simultaneously input from the sensor device 4 to the respective conversion and output circuits 90a, 90b, 90c, 90d, and the voltages are simultaneously input from the respective conversion and output circuits 90a, 90b, 90c, 90d to the digital circuit board 62. Note that the input is not necessarily simultaneous, but may be at different times.

Digital Circuit Board

As shown in FIG. 3, the digital circuit board 62 is provided within the case 2. In the embodiment, the digital circuit board 62 is fixed above the second case member 22 by a fixing member 620 including e.g. a bolt. The digital circuit board 62 is electrically connected to the respective analog circuit boards 61.

The digital circuit board 62 includes the external force detection circuit (not shown) that detects (calculates) the external force based on the voltages V from the analog circuit boards 61. The external force detection circuit calculates translational force components Fx (Fx1, Fx2) in the x-axis directions, translational force components Fy (Fy1, Fy2) in the y-axis directions, translational force components Fz (Fz1, Fz2) in the z-axis directions, rotational force components Mx (Mx1, Mx2) about the x-axis, rotational force components My (My1, My2) about the y-axis, and rotational force components Mz (Mz1, Mz2) about the z-axis. The external force detection circuit may include e.g. an AD converter and an arithmetic circuit (calculation unit) such as a CPU connected to the AD converter.

Relay Board

As shown in FIG. 3, the relay board 63 is placed within the board housing member 26. The relay board 63 is fixed to the second case member 22 by a fixing member 630 including e.g. a bolt. The relay board 63 is electrically connected to the digital circuit board 62 by wiring (not shown) including e.g. a flexible board.

A pathway of feedback control executed by the robot control apparatus (not shown) based on the detection results of the force detection apparatus 1 and an input pathway of correction parameters etc. may be formed by the relay board 63. Note that the relay board 63 is connected to e.g. an external wire (not shown) provided outside of the force detection apparatus 1 and the external wire is connected to the robot control apparatus.

Sensor Device

As shown in FIG. 4, the four sensor devices 4 (piezoelectric sensor devices) are placed to be symmetric with respect to a line segment CL passing through the center axis A1 and parallel to the y-axis as seen from the z-axis direction. Further, the respective sensor devices 4 are arranged at equal angular (90°) intervals from each other along the same circumference around the center axis A1 of the force detection apparatus 1. The respective sensor devices 4 have the same configuration except that the positions within the case 2 are different. The respective sensor devices 4 have functions of detecting external forces (specifically, shear forces) applied along the two axes of the α-axis and the β-axis of the α-axis, the β-axis, and the γ-axis orthogonal to one another. In this case, the respective sensor devices 4 are placed so that the α-axis and the β-axis shown in FIG. 6 may be in the directions shown in FIG. 4.

As shown in FIG. 5, each sensor device 4 has the force detection element 8 (sensor element) and a package 40 housing the force detection element 8. Note that the sensor device 4 is mounted on the above described analog circuit board 61.

Package

As shown in FIG. 5, the package 40 has a base part 41 having a concave portion in which the force detection element 8 is placed and a lid member 42 joined to the base part 41 via a sealing 43 to close the opening of the concave portion.

The base part 41 has a bottom member 411 in a plate shape and a side wall member 412 in a rectangular frame shape joined (fixed) to the bottom member 411. The bottom member 411 includes the top surface 250 of the projecting part 251 as seen from the γ-axis direction. Further, the bottom member 411 is connected to the force detection element 8 via an adhesive member 47 formed using e.g. an adhesive agent having an insulation property. The lid member 42 has a plate shape and the edge side thereof bends toward the base part 41 side to cover the force detection element 8. Further, the center part of the lid member 42 is flat in contact with the first fixing portion 24 and the force detection element 8.

As the specific constituent materials of the base part 41 and the lid member 42, e.g. various metal materials including stainless steel and kovar, various ceramics, etc. may be used.

Force Detection Element

The force detection element 8 (sensor element) shown in FIG. 6 has the two piezoelectric elements 81 that output the electric charge Qα1 according to the external force (shear force) parallel to the α-axis, the two piezoelectric elements 82 that output the electric charge Qα2 according to the external force (shear force) parallel to the α-axis, the two piezoelectric elements 83 that output the electric charge Qβ1 according to the external force (shear force) parallel to the β-axis, the two piezoelectric elements 84 that output the electric charge Qβ2 according to the external force (shear force) parallel to the β-axis, two supporting boards 870, and a plurality of connecting portions 88, and these are stacked as shown in the drawing.

That is, in the embodiment, the stacked two piezoelectric elements 81 are placed on one side of one supporting board 870 of the two supporting boards 870, the stacked two force detection elements 82 are placed on the side of the piezoelectric element 81 opposite to the supporting board 870, the stacked two piezoelectric elements 83 are placed on the side of the piezoelectric element 82 opposite to the piezoelectric elements 81, the stacked two piezoelectric elements 84 are placed on the side of the piezoelectric element 83 opposite to the piezoelectric elements 82, and the other supporting board 870 is placed on the side of the piezoelectric element 84 opposite to the piezoelectric elements 83. Note that the placement of the piezoelectric elements 81, 82, 83, 84 is not limited to the above described placement, but the piezoelectric elements 82 and the piezoelectric elements 83 may be exchanged, for example.

Here, the α-axis directions are an example of the first directions and the α-axis directions (first directions) include the +α-axis direction and the −α-axis direction. Further, the β-axis directions are an example of the second directions different from the first directions and the β-axis directions (second directions) include the +β-axis direction and the −β-axis direction. The α-axis and the β-axis are orthogonal.

Note that the number of piezoelectric elements 81 is not limited to two, but may be one, three, or more. The number of piezoelectric elements 82 is not limited to two, but may be one, three, or more. The number of piezoelectric elements 83 is not limited to two, but may be one, three, or more. The number of piezoelectric elements 84 is not limited to two, but may be one, three, or more.

The force detection element 8 may have e.g. one or more piezoelectric elements (not shown) that output electric charge according to an external force (compression/tensile force) parallel to the γ-axis.

Piezoelectric Element

As shown in FIG. 6, each of the two piezoelectric elements 81 has a ground electrode layer 813 electrically connected to the reference potential (e.g. ground potential GND), a piezoelectric material layer 811 (first piezoelectric material layer), and an output electrode layer 812. Further, the two piezoelectric elements 81 are placed so that the respective output electrode layers 812 may be connected via the connecting portions 88 to each other. Similarly, each of the two piezoelectric elements 82 has a ground electrode layer 823, a piezoelectric material layer 821 (second piezoelectric material layer), and an output electrode layer 822. Further, the two piezoelectric elements 82 are placed so that the respective output electrode layers 822 may be connected via the connecting portions 88 to each other. Similarly, each of the two piezoelectric elements 83 has a ground electrode layer 833, a piezoelectric material layer 831 (third piezoelectric material layer), and an output electrode layer 832. Further, the two piezoelectric elements 83 are placed so that the respective output electrode layers 832 may be connected via the connecting portions 88 to each other. Similarly, each of the two piezoelectric elements 84 has a ground electrode layer 843, a piezoelectric material layer 841 (fourth piezoelectric material layer), and an output electrode layer 842. Further, the two piezoelectric elements 84 are placed so that the respective output electrode layers 842 may be connected via the connecting portions 88 to each other.

The respective piezoelectric material layers 811, 821, 831, 841 are formed using crystal quartz. Thereby, the force detection apparatus 1 having better characteristics such as higher sensitivity, wider dynamic range, and higher rigidity may be realized. Further, as shown in FIG. 6, the piezoelectric material layers 811, 821, 831, 841 are placed so that the directions of the X-axes as crystal axes of the crystal quartz may be different from one another.

The respective piezoelectric material layers 811, 821, 831, 841 are placed so that the directions of the X-axes as crystal axes of the crystal quartz may be the directions shown in FIG. 6.

Specifically, the respective piezoelectric material layers 811 are formed by Y cut quartz crystal plates and placed so that the directions of the X-axes may be different by 180° from each other. That is, the direction of the X-axis of one piezoelectric material layer 811 is toward the positive side of the α-axis directions, and the direction of the X-axis of the other piezoelectric material layer 811 is toward the negative side of the α-axis directions.

The respective piezoelectric material layers 821 are formed by Y cut quartz crystal plates and placed so that the directions of the X-axes may be different by 180° from each other like the respective piezoelectric material layers 811. That is, the direction of the X-axis of one piezoelectric material layer 821 is toward the positive side of the α-axis directions, and the direction of the X-axis of the other piezoelectric material layer 821 is toward the negative side of the α-axis directions.

The respective piezoelectric material layers 831 are formed by Y cut quartz crystal plates and placed so that the directions of the X-axes may be different by 180° from each other. In this case, the directions of the X-axes of the respective piezoelectric material layers 831 are different from the directions of the X-axes of the respective piezoelectric material layers 811, 821 by 90°. That is, the direction of the X-axis of one piezoelectric material layer 831 is toward the positive side of the β-axis directions, and the direction of the X-axis of the other piezoelectric material layer 831 is toward the negative side of the β-axis directions.

The respective piezoelectric material layers 841 are formed by Y cut quartz crystal plates and placed so that the directions of the X-axes may be different by 180° from each other like the respective piezoelectric material layers 831. That is, the direction of the X-axis of one piezoelectric material layer 841 is toward the positive side of the β-axis directions, and the direction of the X-axis of the other piezoelectric material layer 841 is toward the negative side of the β-axis directions.

Note that, in the embodiment, the respective piezoelectric material layers 811, 821, 831, 841 are formed using crystal quartz, however, the layers may have configurations using other piezoelectric materials than crystal quartz. The other piezoelectric materials than crystal quartz include e.g. topaz, barium titanate, lead titanate, lead zirconate titanate (PZT: Pb $(Zr,Ti)O_3$), lithium niobate, and lithium tantalate.

The thicknesses of the respective piezoelectric material layers 811, 821, 831, 841 are respectively not particularly limited, but e.g. from 0.1 μm to 3000 μm.

The respective output electrode layers 812, 822, 832, 842 and the respective ground electrode layers 813, 823, 833, 843 are electrically connected to corresponding side electrodes 46 provided on the side surfaces of the force detection element 8. Further, these output electrode layers 812, 822, 832, 842 are electrically connected to the analog circuit board 61 via conducting connection portions 45 formed using e.g. Ag paste or the like connected to the side electrodes 46, a plurality of internal terminals 44 provided in the package 40, and interconnections (not shown) formed in the base part 41.

The materials forming the respective output electrode layers 812, 822, 832, 842 and the respective ground electrode layers 813, 823, 833, 843 are not particularly limited as long as the materials may function as electrodes, but include e.g. nickel, gold, titanium, aluminum, copper, iron, chromium, or alloys containing the metals. One of them may be used or two or more of them may be combined (stacked, for example) for use.

The thicknesses of the respective output electrode layers 812, 822, 832, 842 and the respective ground electrode layers 813, 823, 833, 843 are respectively not particularly limited, but e.g. from 0.05 μm to 100 μm.

Supporting Board

The respective supporting boards 870 have functions of supporting the piezoelectric elements 81, 82, 83, 84. The thicknesses of these supporting boards 870 are larger than the thicknesses of the respective piezoelectric material layers 811, 821, 831, 841. Thereby, the force detection element 8 may be stably connected to the package 40, which will be described later.

The respective supporting boards 870 are formed using quartz crystal. One supporting board 870 is formed by a quartz crystal plate (Y cut quartz crystal plate) having the same configuration as the piezoelectric material layer 811 of the adjacent piezoelectric element 81, and has the same direction of the X-axis as the piezoelectric material layer 811. Further, the other supporting board 870 is formed by a quartz crystal plate (Y cut quartz crystal plate) having the same configuration as the piezoelectric material layer 841 of the adjacent piezoelectric element 84, and has the same direction of the X-axis as the piezoelectric material layer 841. Here, the quartz crystal has anisotropy, and thus, the coefficients of thermal expansion are different in the X-axis, Y-axis, and Z-axis directions as the crystal axes. Accordingly, it is preferable that the respective supporting boards 870 have the same configurations and placements (the directions of the X-axes) as the adjacent piezoelectric material layers 811, 841 for suppressing forces due to thermal expansion.

Note that the respective supporting boards 870 may be formed using other materials than quartz crystal like the respective piezoelectric material layers 811, 821, 831, 841.

Further, the thicknesses of the respective supporting boards 870 are not particularly limited, but e.g. from 0.1 μm to 5000 μm.

Connecting Portion

The connecting portions 88 are formed using an insulating material and has a function of blocking conduction between the respective piezoelectric elements 81, 82, 83, 84. For the respective connecting portions 88, e.g., silicone, epoxy, acryl, cyanoacrylate, polyurethane adhesive agents may be used.

As above, the force detection element 8 is explained. As described above, the force detection element 8 has the piezoelectric elements 81 including the piezoelectric material layers 811 formed by the Y cut crystal quartz and outputting the electric charge $Q\alpha1$ according to the external force in the α-axis direction, and the piezoelectric elements 83 including the piezoelectric material layers 831 formed by the Y cut crystal quartz and outputting the electric charge $Q\beta1$ according to the external force in the β-axis direction. Further, the force detection element 8 has the piezoelectric elements 82 including the piezoelectric material layers 821 formed by the Y cut crystal quartz and outputting the electric charge $Q\alpha2$ according to the external force in the α-axis direction, and the piezoelectric elements 84 including the piezoelectric material layers 841 formed by the Y cut crystal quartz and outputting the electric charge $Q\beta2$ according to the external force in the β-axis direction. Thereby, the applied external force may be decomposed and detected using the anisotropy of the piezoelectric effect depending on the crystal orientation of the quartz crystal. That is, the translational force components in the α-axis directions and the β-axis directions orthogonal to each other may be independently detected.

As described above, the force detection element 8 includes the plurality of piezoelectric elements 81, 82, 83, 84, and thereby, the number of detection axes may be made larger. Further, the force detection element 8 may independently detect the translational force components of the three axes orthogonal to one another only if the element has at least one of each of the piezoelectric elements 81, 82, 83, 84, however, the output sensitivity may be made higher when the element has two of each of the piezoelectric elements 81, 82, 83, 84 as is the case of the embodiment.

Note that the order of stacking of the respective piezoelectric elements 81, 82, 83, 84 is not limited to that shown in the drawing. Further, the number of piezoelectric elements forming the force detection element 8 is not limited to the above described numbers.

As above, the basic configuration of the force detection apparatus 1 is explained.

The robot 100 (force detection apparatus 1) has the rated measurement mode (first detection mode) and the high-resolution mode (second detection mode) as detection modes (measurement modes) in detection (measurement) of forces (external forces) by the force detection apparatus 1.

In the rated measurement mode, detection (measurement) of the force is performed with standard (normal) resolution. Further, in the rated measurement mode, the range in which the force can be detected (measured) (detectable range) is wider than that in the high-resolution mode. That is, the lower limit values of the respective detectable ranges of the translational force components Fx (Fx1, Fx2) in the x-axis directions, translational force components Fy (Fy1, Fy2) in the y-axis directions, translational force components Fz (Fz1, Fz2) in the z-axis directions, rotational force components Mx (Mx1, Mx2) about the x-axis, rotational force components My (My1, My2) about the y-axis, and rotational force components Mz (Mz1, Mz2) about the z-axis of the external force applied to the force detection apparatus 1 are equal to those in the high-resolution mode, and the upper limit values are larger than those in the high-resolution mode. The detectable ranges in the rated measurement mode are an example of a first range described in the appended claims. Further, for example, the rated load in the rated measurement mode is 250 N and the resolution is 0.1 N.

In the high-resolution mode, force detection is performed with higher resolution than the standard resolution. Thereby, detection accuracy of the force detection apparatus may be improved. The detectable ranges in the high-resolution mode are an example of a second range described in the appended claims. Further, for example, the rated load in the high-resolution mode is 125 N and the resolution is 0.05 N.

In the rated measurement mode, the piezoelectric elements 81, 83 of the piezoelectric elements 81, 82, 83, 84 are used in the respective sensor devices 4. That is, the voltages Vα1, Vβ1 output from the conversion and output circuits 90a, 90c are used. Note that all signals obtained by the piezoelectric elements 81, 82, 83, 84 are input to the digital circuit board 62. As described above, the capacitances C1, C3 of the capacitors 92 connected to the piezoelectric elements 81, 83 are respectively larger than the capacitances C2, C4 of the capacitors 92 connected to the piezoelectric elements 82, 84.

In the high-resolution mode, the piezoelectric elements 82, 84 of the piezoelectric elements 81, 82, 83, 84 are used in the respective sensor devices 4. That is, the voltages Vα2, Vβ2 output from the conversion and output circuits 90b, 90d are used. Note that all signals obtained by the piezoelectric elements 81, 82, 83, 84 are input to the digital circuit board 62.

Here, the above described robot control apparatus includes a switch input unit (not shown) for switching between the rated measurement mode and the high-resolution mode (a selection unit for selecting one of the rated measurement mode and the high-resolution mode). The switching (selection) between the rated measurement mode and the high-resolution mode is performed by the switch input unit (selection unit) when the user uses an input device (not shown) to input the selection to the robot control apparatus. Alternatively, not limited to that, but the robot control apparatus may automatically perform switching between the rated measurement mode and the high-resolution mode instead. The digital circuit board 62 operates according to the set detection mode.

Then, arithmetic formulae used for force detection will be explained. Note that the arithmetic formulae are only an example and can be deformed or changed as appropriate.

First, letting the external forces parallel to the a-axis detected by the two piezoelectric elements 81 of the respective sensor devices 4 be f1α1, f2α1, f3α1, f4α1, the external forces parallel to the β-axis detected by the two piezoelectric elements 83 be f1β1, f2β1, f3β1, f4β1, the external forces parallel to the α-axis detected by the two piezoelectric elements 82 be f1α2, f2α2, f3α2, f4α2, and the external forces parallel to the β-axis detected by the two piezoelectric elements 84 be f1β2, f2β2, f3β2, f4β2, the respective external forces detected by the respective sensor devices 4 are as shown in FIG. 4. Further, the forces in the respective directions detected by the force detection apparatus 1 are expressed by the following formulae. Therefore, the forces in the respective directions may be calculated using the following formulae. Note that, in the respective formulae, predetermined coefficients may be provided with respect to predetermined terms of the respective terms.

Rated Measurement Mode

In the rated measurement mode, the translational force component Fx1 in the x-axis direction is expressed by the following formula (11), the translational force component Fy1 in the y-axis direction is expressed by the following formula (12), the translational force component Fz1 in the z-axis direction is expressed by the following formula (13), the rotational force component Mx1 about the x-axis is expressed by the following formula (14), the rotational force component My1 about the y-axis is expressed by the following formula (15), and the rotational force component Mz1 about the z-axis is expressed by the following formula (16). In this case, as described above, the respective sensor devices 4 are arranged at equal angular (90°) intervals from each other along the same circumference around the center axis A1 of the force detection apparatus 1, and "a" in the following formulae is a radius of a circle 400 on which the respective sensor devices 4 are arranged, i.e., a distance between the center axis A1 and the centers of the sensor devices 4 as seen from the direction of the center axis A1 (see FIG. 4).

$$Fx1 = (f1\alpha1 + f2\alpha1 - f3\alpha1 - f4\alpha1) \times 2^{1/2} \qquad (11)$$

$$Fy1 = (f1\alpha1 - f2\alpha1 - f3\alpha1 + f4\alpha1) \times 2^{1/2} \qquad (12)$$

$$Fz1 = -f1\beta1 + f2\beta1 - f3\beta1 + f4\beta1 \qquad (13)$$

$$Mx1 = (f1\beta1 + f2\beta1 - f3\beta1 - f4\beta1) \times a/2^{1/2} \qquad (14)$$

$$My1 = (f1\beta1 - f2\beta1 - f3\beta1 + f4\beta1) \times a/2^{1/2} \quad (15)$$

$$Mz1 = (f1\alpha1 - f2\alpha1 + f3\alpha1 - f4\alpha1) \times a \times 2^{1/2} \quad (16)$$

In the rated measurement mode, the forces in the respective axis directions are calculated using the above described formulae (11) to (16) in the digital circuit board 62.

Note that, in the rated measurement mode, the forces in the respective axis directions may be further calculated using formulae in the high-resolution mode, which will be described later.

High-Resolution Mode

In the high-resolution mode, the translational force component Fx2 in the x-axis direction is expressed by the following formula (21), the translational force component Fy2 in the y-axis direction is expressed by the following formula (22), the translational force component Fz2 in the z-axis direction is expressed by the following formula (23), the rotational force component Mx2 about the x-axis is expressed by the following formula (24), the rotational force component My2 about the y-axis is expressed by the following formula (25), and the rotational force component Mz2 about the z-axis is expressed by the following formula (26). "a" in the following formulae are the same as "a" in the formulae in the rated measurement mode.

$$Fx2 = (f1\alpha2 + f2\alpha2 - f3\alpha2 - f4\alpha2) \times 2^{1/2} \quad (21)$$

$$Fy2 = (f1\alpha2 - f2\alpha2 - f3\alpha2 + f4\alpha2) \times 2^{1/2} \quad (22)$$

$$Fz2 = -f1\beta2 + f2\beta2 - f3\beta2 + f4\beta2 \quad (23)$$

$$Mx2 = (f1\beta2 + f2\beta2 - f3\beta2 - f4\beta2) \times a/2^{1/2} \quad (24)$$

$$My2 = (f1\beta2 - f2\beta2 - f3\beta2 + f4\beta2) \times a/2^{1/2} \quad (25)$$

$$Mz2 = (f1\alpha2 - f2\alpha2 + f3\alpha2 - f4\alpha2) \times a \times 2^{1/2} \quad (26)$$

In the high-resolution mode, the forces in the respective axis directions are calculated using the above described formulae (21) to (26) in the digital circuit board 62.

Note that, in the high-resolution mode, the forces in the respective axis directions may be further calculated using the formulae in the above described rated measurement mode.

As described above, according to the force detection apparatus 1 (robot 100), the rated measurement mode and the high-resolution mode are provided. Thus, one of the rated measurement mode and the high-resolution mode is selected according to the magnitude of the force to be detected and the resolution to be required, and thereby, the force may be properly detected.

Note that, in the embodiment, the first range and the second range partially overlap, however, the first range and the second range do not necessarily overlap.

Further, in the embodiment, the first range and the second range are set for all of the force components in the six axis directions, however, it is only necessary that the first range and the second range are set for at least one of the force components in the six axis directions.

Explanation of Modified Examples

In the force detection apparatus 1 (robot 100), the high-resolution mode in the above described embodiment may be changed to a high-load measurement mode (second detection mode).

In the high-load measurement mode, the detectable ranges are wider than those in the rated measurement mode. That is, the lower limit values of the detectable ranges are equal to those in the rated measurement mode and the upper limit values are larger than those in the rated measurement mode. For example, the rated load in the high-load measurement mode is 500 N. Accordingly, in the high-load measurement mode, high-load measurement can be made. The high-load measurement mode may be used for detection of an error of application of an excessive force.

Further, in the high-load measurement mode, the piezoelectric elements 82, 84 of the piezoelectric elements 81, 82, 83, 84 are used in each sensor device 4. That is, the voltages Vα2, Vβ2 output from the conversion and output circuits 90b, 90d are used. In this case, the static capacitance C2 of the capacitor 92 connected to the piezoelectric element 82 is set to be larger than the capacitance C1 of the capacitor 92 connected to the piezoelectric element 81, and the capacitance C4 of the capacitor 92 connected to the piezoelectric element 84 is set to be larger than the capacitance C3 of the capacitor 92 connected to the piezoelectric element 83. Note that C1 and C3 may be the same or different. Similarly, C2 and C4 may be the same or different.

As described above, the force detection apparatus 1 includes the first case member 21 (first member), the second case member 22 (second member), and the sensor devices 4 (piezoelectric sensor devices) sandwiched by the first case member 21 (first member), the second case member 22 (second member) and outputting electric charge according to the external force. Further, in the force detection apparatus 1, the detectable range of the components of the external force in the predetermined axis directions (the translational force components Fx in the x-axis directions, the translational force components Fy in the y-axis directions, the translational force components Fz in the z-axis directions, the rotational force components Mx about the x-axis, the rotational force components My about the y-axis, and the rotational force components Mz about the z-axis) is the first range and the external force is detected within the first range, and the detectable range is the second range different from the first ranges and the external force is detected within the second range.

According to the force detection apparatus 1, the first range and the second range different from each other may be set as the detectable ranges. That is, the apparatus has the rated measurement mode and the high-resolution mode. Therefore, one of the rated measurement mode and the high-resolution mode is selected according to the magnitude of the force to be detected, and thereby, the force may be properly detected.

Here, in the detection of the force components in the six axis directions as an example, the external force detection includes not only the calculation of the force components in the six axis directions but also obtainment of the signals used for the calculation of the force components in the six axis directions (e.g. the voltages output from the conversion and output circuits).

The sensor device 4 (piezoelectric sensor device) includes the force detection element 8 (sensor element) placed in the first case member 21 (first member). Further, the force detection element 8 (sensor element) includes the piezoelectric material layer 811 (first piezoelectric material layer) and the piezoelectric material layer 821 (second piezoelectric material layer) placed on one side of the piezoelectric material layer 811 (first piezoelectric material layer). Furthermore, the piezoelectric material layer 811 (first piezoelectric material layer) and the piezoelectric material layer 821 (second piezoelectric material layer) respectively output electric charge according to the external forces applied in the α-axis directions as the example of the first directions. Thereby, the forces applied in the α-axis directions (first directions) may be detected.

The force detection apparatus 1 includes the conversion and output circuit 90a (first conversion and output circuit) having the capacitor 92 (first capacitor) and converting the electric charge output from the piezoelectric material layer 811 (first piezoelectric material layer) into a voltage and outputting the voltage, and the conversion and output circuit 90b (second conversion and output circuit) having the capacitor 92 (second capacitor) with different capacitance from that of the capacitor 92 (first capacitor) of the conversion and output circuit 90a and converting the electric charge output from the piezoelectric material layer 821 (second piezoelectric material layer) into a voltage and outputting the voltage. Thereby, the rated measurement mode and the high-resolution mode may be realized.

The force detection element 8 (sensor element) includes the piezoelectric material layer 831 (third piezoelectric material layer) placed on the side of the piezoelectric material layer 821 (second piezoelectric material layer) opposite to the piezoelectric material layer 811 (first piezoelectric material layer), and the piezoelectric material layer 841 (fourth piezoelectric material layer) placed on the side of the piezoelectric material layer 831 (third piezoelectric material layer) opposite to the piezoelectric material layer 821 (second piezoelectric material layer). Further, the piezoelectric material layer 831 (third piezoelectric material layer) and the piezoelectric material layer 841 (fourth piezoelectric material layer) respectively output electric charge according to the external forces applied in the β-axis directions as the example of the second directions different from the α-axis directions (first directions). Thereby, the forces applied in the β-axis directions (second directions) may be detected.

Further, the α-axis directions (first directions) and the β-axis directions (second directions) are orthogonal. Thereby, the forces applied in the α-axis directions (first directions) and the forces applied in the β-axis directions (second directions) orthogonal to the α-axis directions (first directions) may be detected.

The force detection apparatus 1 includes the conversion and output circuit 90c (third conversion and output circuit) having the capacitor 92 (third capacitor) and converting the electric charge output from the piezoelectric material layer 831 (third piezoelectric material layer) into a voltage and outputting the voltage, and the conversion and output circuit 90d (fourth conversion and output circuit) having the capacitor 92 (fourth capacitor) with different capacitance from that of the capacitor 92 (third capacitor) of the conversion and output circuit 90c and converting the electric charge output from the piezoelectric material layer 841 (fourth piezoelectric material layer) into a voltage and outputting the voltage. Thereby, the rated measurement mode and the high-resolution mode may be realized.

Further, the force detection apparatus 1 has the plurality of (four in the embodiment) force detection elements 8. Thereby, the translational force components Fx in the x-axis directions, the translational force components Fy in the y-axis directions, the translational force components Fz in the z-axis directions, the rotational force components Mx about the x-axis, the rotational force components My about the y-axis, and the rotational force components Mz about the z-axis may be detected.

The first range and the second range have equal lower limit values, but different upper limit values. Therefore, in the case where the upper limit value of the first range is larger than the upper limit value of the second range as an example, when the force to be detected is equal to or smaller than the upper limit value of the second range, the high-resolution mode is selected, and thereby, the detection may be accurately performed. Alternatively, when the force to be detected exceeds the upper limit value of the second range, the rated measurement mode is selected, and thereby, the detection may be performed.

The robot 100 includes the robot arm 10 and the force detection apparatus 1 provided in the robot arm 10.

According to the robot 100, the first range and the second range are set as the detectable ranges. That is, the robot has the rated measurement mode and the high-resolution mode. Therefore, one of the rated measurement mode and the high-resolution mode is selected according to the magnitude of the force to be detected, and thereby, the force may be properly detected.

As above, the force detection apparatus and the robot according to the invention are explained based on the illustrated embodiments, however, the invention is not limited to those. The configurations of the respective parts may be replaced by arbitrary configurations having the same functions. Further, other arbitrary configurations may be added to the invention.

Alternatively, arbitrary two or more configurations (features) of the above described respective embodiments may be combined.

In the force detection apparatus according to the invention, the pressurization bolts may be provided as appropriate or omitted.

In the above described embodiments, the sensor device includes the package, however, may not include a part or entire of the package. For example, the sensor device does not necessarily include the lid member of the package. Alternatively, the sensor device does not necessarily include the sealing member. The base part and the lid member may be directly joined or connected by fitting or the like.

Further, in the above described embodiments, the first fixing portion and the second fixing portion are provided orthogonally to the first plate and the second plate, however, not limited to those. The portions may be parallel or inclined with respect to the plates. That is, in the above described embodiments, the sensor device is orthogonal to the first plate and the second plate, however, not limited to that. The device may be parallel or inclined with respect to the plates. Alternatively, the first fixing portion and the second fixing portion may be omitted. That is, the sensor device 4 may be sandwiched by the first plate and the second plate and pressurized. In this case, the first plate may be regarded as the first member and the second plate may be regarded as the second member.

In the above described embodiments, the number of rotation axes of the robot arm is six, however, the invention is not limited to that. The number of rotation axes of the robot arm may be e.g. two, three, four, five, seven, or more. That is, in the above described embodiments, the number of arms (links) is six, however, the invention is not limited to that. The number of arms may be e.g. two, three, four, five, seven, or more.

Further, in the above described embodiments, the number of robot arms is one, however, the invention is not limited to that. The number of robot arms may be e.g. two or more. That is, the robot may be e.g. a multi-arm robot such as a dual-arm robot.

In the invention, the robot (robot main body) may be a robot of another type (system). Specific examples include e.g. horizontal articulated robots such as scalar robots, parallel link robots, legged walking (running) robots having legs, etc.

The force detection apparatus according to the invention can be provided in various other apparatuses than the robots and may be mounted on e.g. vehicles such as automobiles.

The entire disclosure of Japanese Patent Application No. 2017-128485, filed Jun. 30, 2017 is expressly incorporated by reference herein.

What is claimed is:

1. A force detection apparatus comprising:
a first member;
a second member;
a piezoelectric sensor device sandwiched by the first member and the second member and outputting electric charge according to an external force; and
a conversion and output circuit converting an electric charge output from the piezoelectric sensor device into a voltage and outputting the voltage,
wherein, when a detectable range of a component of the external force in a predetermined axis direction is a first range, the external force is detected within the first range, and, when the detectable range is a second range different from the first range, the external force is detected within the second range.

2. The force detection apparatus according to claim 1, wherein the piezoelectric sensor device includes a sensor element placed in the first member,
the sensor element includes a first piezoelectric material layer and a second piezoelectric material layer placed on one side of the first piezoelectric material layer, and
the first piezoelectric material layer and the second piezoelectric material layer respectively output electric charge according to external forces applied in first directions.

3. The force detection apparatus according to claim 2, wherein the conversion and output circuit includes:
a first conversion and output circuit having a first capacitor, and converting the electric charge output from the first piezoelectric material layer into a voltage and outputting the voltage; and
a second conversion and output circuit having a second capacitor, and converting the electric charge output from the second piezoelectric material layer into a voltage and outputting the voltage, and
the capacitance of the second capacitor is different from that that of the first capacitor.

4. The force detection apparatus according to claim 2, wherein the sensor element includes a third piezoelectric material layer placed on a side of the second piezoelectric material layer opposite to the first piezoelectric material layer, and a fourth piezoelectric material layer placed on a side of the third piezoelectric material layer opposite to the second piezoelectric material layer, and
the third piezoelectric material layer and the fourth piezoelectric material layer respectively output electric charge according to external forces applied in second directions different from the first directions.

5. The force detection apparatus according to claim 4, wherein the first directions and the second directions are orthogonal.

6. The force detection apparatus according to claim 4, wherein the conversion and output circuit includes:
a third conversion and output circuit having a third capacitor, and converting the electric charge output from the third piezoelectric material layer into a voltage and outputting the voltage; and
a fourth conversion and output circuit having a fourth capacitor with different capacitance from that of the third capacitor, and converting the electric charge output from the fourth piezoelectric material layer into a voltage and outputting the voltage, and
the capacitance of the fourth capacitor is different from that that of the third capacitor.

7. The force detection apparatus according to claim 2, comprising a plurality of the sensor elements.

8. The force detection apparatus according to claim 1, wherein the first range and the second range have equal lower limit values, but different upper limit values.

9. A robot comprising:
a robot arm; and
a force detection apparatus provided in the robot arm, wherein the force detection apparatus includes:
a first member;
a second member;
a piezoelectric sensor device sandwiched by the first member and the second member and outputting electric charge according to an external force; and
a conversion and output circuit converting an electric charge output from the piezoelectric sensor device into a voltage and outputting the voltage, and
when a detectable range of a component of the external force in a predetermined axis direction is a first range, the external force is detected within the first range, and, when the detectable range is a second range different from the first range, the external force is detected within the second range.

10. The robot according to claim 9, wherein the piezoelectric sensor device includes a sensor element placed in the first member,
the sensor element includes a first piezoelectric material layer and a second piezoelectric material layer placed on one side of the first piezoelectric material layer, and
the first piezoelectric material layer and the second piezoelectric material layer respectively output electric charge according to external forces applied in first directions.

11. The robot according to claim 10, wherein the conversion and output circuit includes:
a first conversion and output circuit having a first capacitor, and converting the electric charge output from the first piezoelectric material layer into a voltage and outputting the voltage, and
a second conversion and output circuit having a second capacitor, and converting the electric charge output from the second piezoelectric material layer into a voltage and outputting the voltage, and
the capacitance of the second capacitor is different from that that of the first capacitor.

12. The robot according to claim 10, wherein the sensor element includes:
a third piezoelectric material layer placed on a side of the second piezoelectric material layer opposite to the first piezoelectric material layer, and
a fourth piezoelectric material layer placed on a side of the third piezoelectric material layer opposite to the second piezoelectric material layer, and
the third piezoelectric material layer and the fourth piezoelectric material layer respectively output electric charge according to external forces applied in second directions different from the first directions.

13. The robot according to claim 12, wherein the first directions and the second directions are orthogonal.

14. The robot according to claim 12, wherein the conversion and output circuit includes: a third conversion and output circuit having a third capacitor, and converting the electric charge output from the third piezoelectric material layer into a voltage and outputting the voltage, and
- a fourth conversion and output circuit having a fourth capacitor, and converting the electric charge output from the fourth piezoelectric material layer into a voltage and outputting the voltage, and
- the capacitance of the fourth capacitor is different from that that of the third capacitor.

15. The robot according to claim 10, wherein the force detection apparatus includes a plurality of the sensor elements.

16. The robot according to claim 9, wherein the first range and the second range have equal lower limit values, but different upper limit values.

\* \* \* \* \*